F. ACKERMAN.
FISHING BAIT.
APPLICATION FILED MAY 22, 1919.
1,326,821.
Patented Dec. 30, 1919.
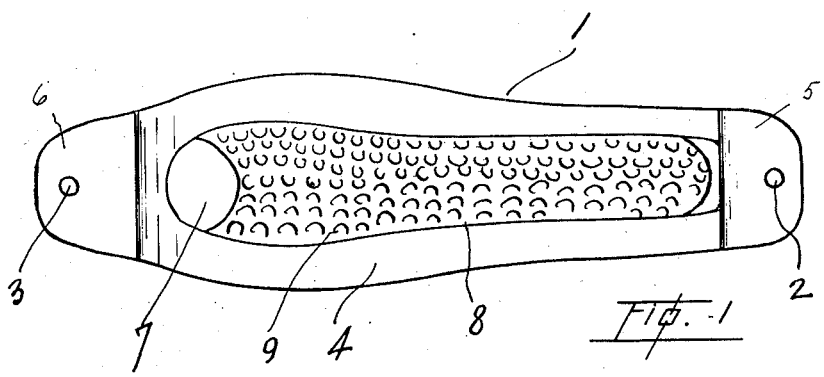
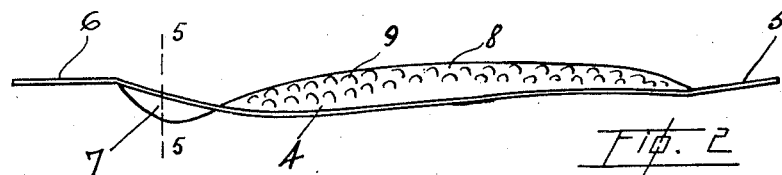
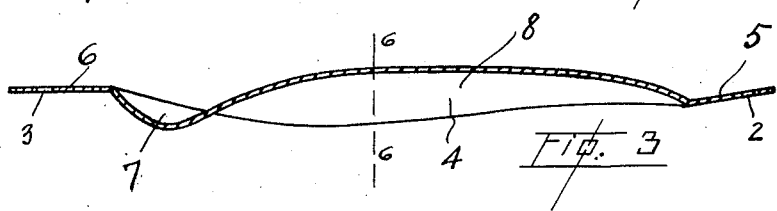
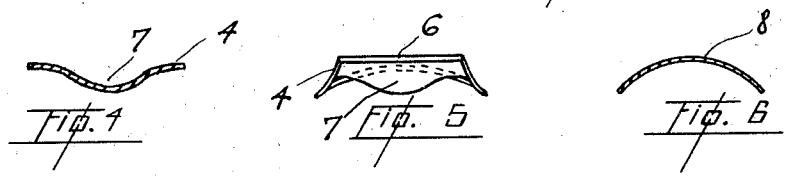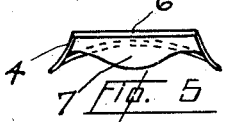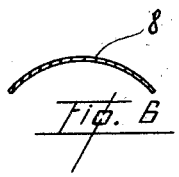
INVENTOR
Fred. Ackerman.
BY
ATTYS

UNITED STATES PATENT OFFICE.

FRED ACKERMAN, OF VANCOUVER, BRITISH COLUMBIA, CANADA.

FISHING-BAIT.

1,326,821.

Specification of Letters Patent.  Patented Dec. 30, 1919.

Application filed May 22, 1919. Serial No. 298,890.

*To all whom it may concern:*

Be it known that I, FRED ACKERMAN, a citizen of the United States, and a resident of the city of Vancouver, in the Province of British Columbia, Canada, have invented certain new and useful Improvements in Fishing-Baits, of which the following is a specification.

My invention relates to improvements in fishing baits, and the object of my invention is to provide an artificial spoon bait following closely the lines of a fish for use in trolling for salmon and other kinds of fish the construction of which is such that it is adapted for slow trolling as well as fast without its efficiency as a lure being destroyed and which is of great rigidity so that it cannot be readily bent or warped and thus put out of balance.

I attain this object by the construction illustrated in the accompanying drawings in which—

Figure 1 is a plan view of the spoon.

Fig. 2 is an edge view.

Fig. 3 is a longitudinal sectional view taken through the center line.

Fig. 4 is a cross section taken on the line 5—5 of Fig. 2.

Fig. 5 is a tail end view.

Fig. 6 is a cross section taken on the line 6—6 of Fig. 2.

Similar figures of reference indicate similar parts throughout the several views.

1 indicates generally the spoon portion of the bait provided at its opposite ends with holes 2 and 3 to which the hook and the trolling line may be respectively attached by any suitable means.

The bait may be made of any size and material and may be used for any kind of fish. The spoon is formed out of one piece of metal 4 and at its opposite ends it is flat for a portion of its length, the flat portion 5 at its head end being on a lower plane than the flat portion 6 at its tail end, while adjacent the flat portion 6 a bowl-shaped depression 7 is formed. The part of the spoon between the depression 7 and the flat head portion 5 is arched longitudinally and formed concave transversely as at 8, and at a point nearer the tail end than the head end this part is wider than the remainder of the spoon body so that the edges of the plate taper inwardly toward their respective ends, or in other words, the spoon when viewed on its side, follows substantially the lines of a fish and, to increase the luring effect, the concave portion is hammered so that dents 9 are formed in its surface having the appearance of fish scales.

On account of the construction described the spoon possesses great strength so that the possibility of its being twisted or deformed by the pull of a very heavy fish is obviated while at the same time the tendency to flop and turn over is eliminated, thus insuring the highest efficiency at either fast or slow trolling speed.

What I claim as my invention is:

1. A fishing bait formed out of a metal plate having its ends flat and its intermediate portion formed as a concave body extending longitudinally between the ends.

2. A fishing bait formed out of a metal plate having its ends flat and its intermediate portion formed as a concave body extending longitudinally between the ends and provided between its flat tail end and the concavity with a bowl-shaped depression.

3. A fishing bait formed out of a metal plate having its ends flat and its intermediate portion arched to form a concave body extending longitudinally between the ends and being provided between its flat tail end and the concavity with a bowl-shaped depression, the flat head end being on a lower plane than the flat tail end.

4. A fishing bait formed out of a metal plate having its ends flat and its intermediate portion formed as a concave body extending longitudinally between the ends and being provided with a bowl-shaped depression between the flat tail end and the concavity, the inner surface of the concavity being indented with a plurality of dents so as to produce on the outer surface the appearance of fish scales.

5. A fishing bait formed out of a metal plate having its ends flat and of less width than the intermediate portion the edges of which are curved and taper toward the ends from a point nearer the tail end than the head end, the intermediate portion of said plate being arched so that a concave body is formed extending longitudinally between the ends and being provided with a bowl-shaped depression between the tail end and the concavity.

Dated at Vancouver, B. C. this 6th day of May, 1919.

FRED ACKERMAN.